US 9,584,599 B2

United States Patent
Hrischuk et al.

(10) Patent No.: US 9,584,599 B2
(45) Date of Patent: Feb. 28, 2017

(54) METHOD AND SYSTEM FOR PRESENTING STORAGE IN A CLOUD COMPUTING ENVIRONMENT

(71) Applicant: NETAPP, INC., Sunnyvale, CA (US)

(72) Inventors: Curtis Hrischuk, Holly Springs, NC (US); Phil Larson, Chapel Hill, NC (US)

(73) Assignee: NETAPP, INC., Sunnyvale, CA (US)

( * ) Notice: Subject to any disclaimer, the term of this patent is extended or adjusted under 35 U.S.C. 154(b) by 204 days.

(21) Appl. No.: 14/155,037

(22) Filed: Jan. 14, 2014

(65) Prior Publication Data
US 2015/0201017 A1 Jul. 16, 2015

(51) Int. Cl.
*H04L 29/08* (2006.01)
*H04L 12/911* (2013.01)
*H04L 12/801* (2013.01)
*G06F 3/06* (2006.01)

(52) U.S. Cl.
CPC .......... *H04L 67/1097* (2013.01); *H04L 47/29* (2013.01); *H04L 47/70* (2013.01); *G06F 3/067* (2013.01); *H04L 67/322* (2013.01)

(58) Field of Classification Search
CPC ............... H04L 67/322; H04L 67/1097; H04L 41/5019; G06F 3/067; G06F 9/5072
See application file for complete search history.

(56) References Cited

U.S. PATENT DOCUMENTS

| 2003/0093501 A1* | 5/2003 | Carlson | G06F 9/50 709/220 |
| 2011/0252214 A1* | 10/2011 | Naganuma | G06F 3/0607 711/170 |
| 2012/0131196 A1* | 5/2012 | Yamada | G06F 11/3485 709/226 |
| 2012/0317358 A1* | 12/2012 | Ando | G06F 3/0605 711/117 |
| 2014/0025909 A1* | 1/2014 | Naor | G06F 3/0641 711/162 |

OTHER PUBLICATIONS

Shafer, J.; "I'O Virtualization Bottlenecks in Cloud Computing Today"; Second Workshop on I/O Virtualization (WIOV '10); Mar. 13, 2010, Pittsburgh, PA; http://sysrun.haifa.il.ibm.com/hrl/wiov2010/papers/shafer.pdf.
"Amazon Elastic Block Store Persistent black storage for Amazon EC2"; http://aws.arnazon.com/ebs/.

(Continued)

*Primary Examiner* — Anthony Mejia
(74) *Attorney, Agent, or Firm* — Klein, O'Neill & Singh, LLP

(57) ABSTRACT

Methods and systems for presenting a plurality of options to a client for using storage space in a cloud computing environment are provided. Each option is associated with a latency target and/or a throughput target. The latency target provides a delay in processing input/output (I/O) requests and the throughput target provides a number of I/O requests that are processed within a unit of time. An existing volume is assigned to the client when the existing volume meets a guaranteed latency target and/or a guaranteed throughput target for an option selected from the plurality of options, otherwise a new volume is allocated.

14 Claims, 7 Drawing Sheets

(56) References Cited

OTHER PUBLICATIONS

Rodrigues, T.; "IaaS cloud provider comparison spreadsheet"; Jan. 2012; http://www.techrepublic.com/downloads/iaas-cloud-provider-comparison-spreadsheet/3809923.
"Microsoft Azure: Cloud Computing Platform & Services"; http://technet.microsoft.com/en-us/cloud/gg663909.
"Amazon S3 Simple, durable, massively scalable object storage"; http://aws.amazon.com/s3/.
"Cloud Databases Powered by Openstack MySQL Database-as-a-Service: Easy, Fast and Fully Managed"; http://www.rackspace.com/cloud/cloud_hostina_products/databases/.
"Cloud Files Powered by Openstack Scalable cloud object storage"; http://www.rackspace.com/cloud/cloud_hosting_products/files/.
"Software—OpenStack Open Source Cloud Computing Software"; http://openstack.org/projects/storage/.
"The Open Group" webpage; https://www.opengroup.org/cloudcomputing/uploads/40/23840/CCRA.IBMSubmission.02282011.doc.
Pritchard, J; "IBM Cloud Computing Reference Architecture"; Jan. 2010; IBM Corporation; https://www.google.com/url?sa=t&rct=j&q=&esrc=s&source=web&cd=1&ved=0CIQBEBYwAA&url=https%3A%2F%2Fwww.ibm.com%2Fdeveloperworks%2Fmydeveloperworks%2Ffiles%2Fform%2Fanonymous%2Fapi9%Flibrary%2Ff97e9a15-5e71-41fa-a36e-42c03009f26e%2Fdocument%2F3f54a55a-6988-49b0-a2af-003f8ab24bf3%2Fmedia%2F201-%2520Cloud%2520 Computing%2520Reference%2520Architecture.odp&ei=IfCTT-fuCrDciQK7_cDrDw&usq=AFQiCNFF-9-ZRKYNRV78 mx7d7T6_LrukuTQ&sig2=nUlgXuXIRvBfK2FfxbXSbw&cad=ria.

* cited by examiner

METHOD AND SYSTEM FOR PRESENTING STORAGE IN A CLOUD COMPUTING ENVIRONMENT

TECHNICAL FIELD

The present disclosure relates to presenting storage space in a cloud computing environment.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple clients with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Storage systems are being used extensively in virtual environments where a physical resource is time-shared among a plurality of independently operating processor executable virtual machines. Typically, storage space is presented to a virtual machine as a virtual hard disk (VHD) file. A storage drive (for example, C:\) is then presented to a client via a user interface within a virtual machine context. The client can use the storage drive to access storage space to read and write information.

Cloud computing with virtual machines is becoming popular today. Cloud computing means computing capability that provides an abstraction between a computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources.

In the cloud computing environment, storage space is made available to clients by a cloud provider for storing information. Typically, the cloud provider licenses a certain storage space amount to clients. Cloud providers today do not have a mechanism that allows them to accurately provision storage space or market and license storage space based on performance parameters, for example, throughput and latency. Throughput means a number of input/output requests that can be processed within a given duration (IOPS) and latency means delay in processing an I/O (input/output) request. Continuous efforts are being made to efficiently present storage space to clients in the cloud computing environment.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, methods and systems for presenting storage space in a cloud computing environment is provided. A client system is presented with a plurality of options. Each option is associated with a latency and/or a throughput target for using the storage space for the client system. A plurality of data structures are maintained for providing latency and throughput targets for each of the plurality of options. As described below in detail, the client selects one of the options and is provided with the latency and/or throughput that is associated with the selected option.

Figure 1:
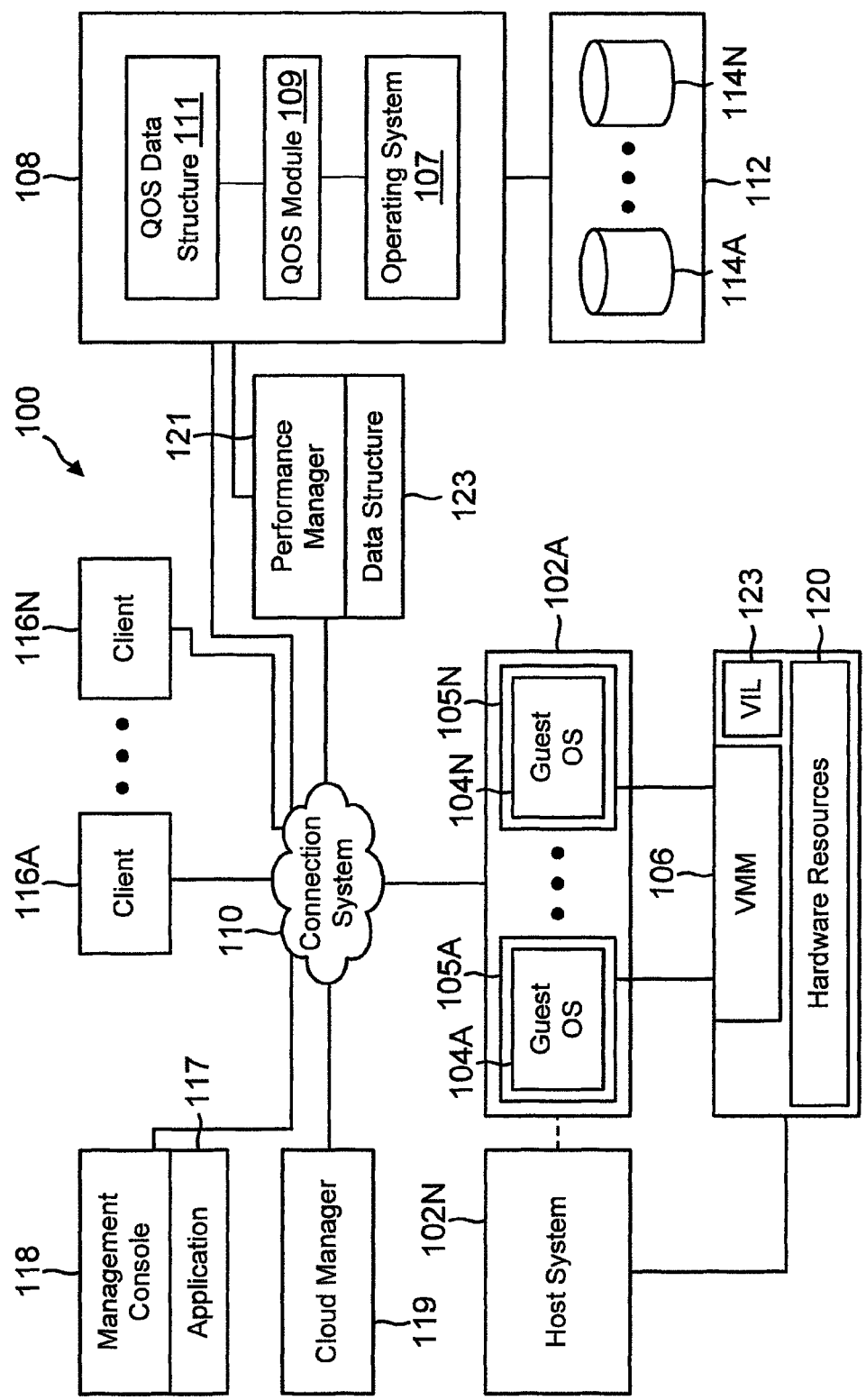
FIG. 1 shows an example of an operating environment for the various aspects disclosed herein.

System 100:

FIG. 1 shows an example of a system 100, where the adaptive aspects disclosed herein may be implemented. System 100 includes a virtual machine environment where a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

In one aspect, system 100 may include a plurality of computing systems 102A-102N (may also be referred to individually as a host platform/system 102 or simply as server 102) communicably coupled to a storage system 108 executing a storage operating system 107 via a connection system 110 such as a local area network (LAN), wide area network (WAN), the Internet and others. As described herein, the term "communicably coupled" may refer to a direct connection, a network connection, or other connections to enable communication between devices.

Host platform 102 includes provides a virtual machine environment executing a plurality of VMs 105A-105N that may be presented to client computing devices/systems 116A-116N. VMs 105A-105N execute a plurality of guest OS 104A-104N (may also be referred to as guest OS 104) that share hardware resources 120. As described above, hardware resources 120 may include storage, CPU, memory, I/O devices or any other hardware resource.

In one aspect, host platform 102 interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 presents and manages the plurality of guest OS 104A-104N executed by the host platform 102. The VMM 106 may include or interface with a virtualization layer (VIL) 123 that provides one or more virtualized hardware resource to each OS 104A-104N.

In one aspect, VMM 106 is executed by host platform 102 with VMs 105A-105N. In another aspect, VMM 106 may be executed by an independent stand-alone computing system, often referred to as a hypervisor server or VMM server and VMs 105A-105N are presented at one or more computing systems.

It is noteworthy that different vendors provide different virtualization environments, for example, VMware Corporation, Microsoft Corporation and others. Data centers may have hybrid virtualization environments/technologies, for example, Hyper-V and hypervisor based virtual environment. The generic virtualization environment described above with respect to FIG. 1 may be customized depending on the virtual environment to implement the aspects of the present disclosure. Furthermore, VMM 106 (or VIL 123) may execute other modules, for example, a storage driver, network interface and others, the details of which are not germane to the aspects described herein and hence have not been described in detail.

System 100 may also include a management console 118 that executes a processor executable management application 117 for managing and configuring various elements of system 100. Application 117 may be used to manage and configure VMs as well as configure resources that are used by VMs, according to one aspect. It is noteworthy that although a single management console 118 is shown in FIG. 1, system 100 may include other management consoles performing certain functions, for example, managing storage systems, managing network connections and other functions described below.

In one aspect, storage system 108 has access to a set of mass storage devices 114A-114N (may be referred to as storage devices 114) within at least one storage subsystem 112. The mass storage devices 114 may include writable storage device media such as magnetic disks, video tape, optical, DVD, magnetic tape, non-volatile memory devices for example, solid state drives (SSDs) including self-encrypting drives, flash memory devices and any other similar media adapted to store information. The storage devices 114 may be organized as one or more groups of Redundant Array of Independent (or Inexpensive) Disks (RAID). The various aspects disclosed are not limited to any particular storage device type or storage device configuration.

In one aspect, the storage system 108 provides a set of logical storage volumes (or logical unit numbers (LUNs) for a storage area network (SAN)) to VMM 106 that presents storage space to VMs 105A-105N. Each volume may be configured to store data files (or data containers or data objects), scripts, word processing documents, executable programs, and any other type of structured or unstructured data. From the perspective of one of the client systems, each volume can appear to be a single drive. However, each volume can represent storage space in at one storage device, an aggregate of some or all of the storage space in multiple storage devices, a RAID group, or any other suitable set of storage space.

The storage operating system 107 organizes storage space at storage devices 114 as one or more "aggregate", where each aggregate is identified by a unique identifier and a location. Within each aggregate, one or more storage volumes are created whose size can be varied. A qtree, sub-volume unit may also be created within the storage volumes. As a special case, a qtree may be an entire storage volume.

The storage system 108 may be used to store and manage information at storage devices 114 based on a client request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

In a typical mode of operation, a client (for example, a VM) transmits one or more input/output (I/O) commands, such as a CFS or NFS request, over connection system 110 to the storage system 108. Storage system 108 receives the request, issues one or more I/O commands to storage devices 114 to read or write the data on behalf of the client system, and issues a CIFS or NFS response containing the requested data over the network 110 to the respective client system.

Although storage system 108 is shown as a stand-alone system, i.e. a non-cluster based system, in another aspect, storage system 108 may have a distributed architecture; for example, a cluster based system that is described below in detail with respect to FIG. 2A.

System 100 includes a performance manager 121 that interfaces with the storage operating system 107 for sending and receiving quality of service (QOS) data. QOS at the storage system level may be implemented by a QOS module 109 that maintains one or more QOS data structure 111. QOS module 109 is used to implement a guaranteed latency and/or a throughput rate for processing input/output (I/O) requests.

The term guaranteed latency as used herein means that a VM or client is guaranteed that an I/O request will be processed within certain duration. The term guaranteed throughput as used herein means a guaranteed number of IOPS (input/output operations per second) that are processed for a client. Throughput may be expressed as an absolute value or as a percentile metric (for example, a certain percentage of the total number of requests).

QOS module 109 stores QOS data at data structure 111. The data structure 111 identifies each storage volume and the associated latency and throughput. QOS module 109 provides this information to the storage operation system 107 such that storage operating system 107 can prioritize and process I/O requests based on the latency and throughput rates associated with the storage volumes. The storage operating system 107 maintains a plurality of queues (not shown) for providing QOS for each storage volume. The QOS values may be set using the management application 117.

The performance manager 121 obtains QOS data from storage operating system 107 and stores it at a local data structure 123. The performance manager 123 may be used for presenting storage space to clients in a cloud computing environment with guaranteed latency and throughput rates. In one aspect, a cloud manager 119 (also shown as 220, FIG. 2B) presents a plurality of options to one or more client system 116A-116N via connection system 110. Each option is associated with a latency and/or throughput rate. A higher latency and lower throughput for a first option may be charged a lower amount vis-à-vis a second option that may provide lower latency and higher throughput.

As described below in detail, the performance manager 121 uses data structure 123 for assigning an existing volume for a selected option or finding a new volume. Before describing the details of how these options are presented, the following describes an example of a clustered storage system.

Figure 2A:
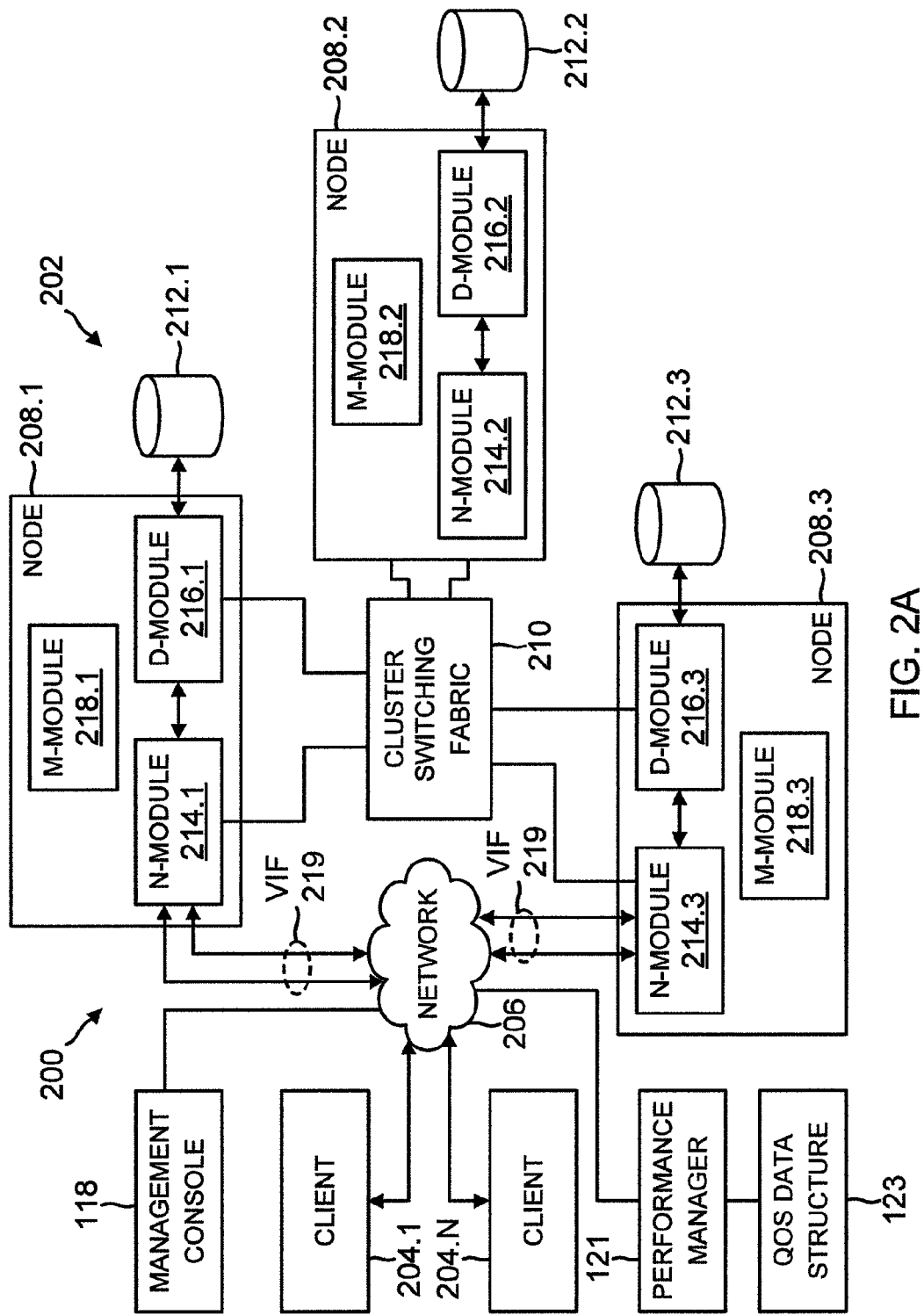
FIG. 2A shows an example of a clustered storage system, used according to one aspect of the present disclosure.

Clustered System:

FIG. 2A shows a cluster based storage environment 200 having a plurality of nodes for managing storage devices and the performance manager 121 that maintains the QOS data structure 121 for providing certain throughput and/or latency for client systems via a cloud computing environment, according to one aspect. Storage environment 200 may include a plurality of client systems 204.1-204.N, a clustered storage system 202 (similar to storage system 108), management console 118 and at least a network 206 communicably connecting the client systems 204.1-204.N and the clustered storage system 202.

The clustered storage system 202 includes a plurality of nodes 208.1-208.3, a cluster switching fabric 210, and a plurality of mass storage devices 212.1-212.3 (may be referred to as 212 and similar to storage device 114). Each of the plurality of nodes 208.1-208.3 is configured to include an N-module, a D-module, and an M-Module, each of which can be implemented as a processor executable module. Specifically, node 208.1 includes an N-module 214.1, a D-module 216.1, and an M-Module 218.1, node 208.2 includes an N-module 214.2, a D-module 216.2, and an M-Module 218.2, and node 208.3 includes an N-module 214.3, a D-module 216.3, and an M-Module 218.3.

The N-modules 214.1-214.3 include functionality that enable the respective nodes 208.1-208.3 to connect to one or more of the client systems 204.1-204.N (or the performance manager 121) over the computer network 206. The N-modules handle file network protocol processing (for example, CFS, NFS and/or iSCSI requests). The D-modules 216.1-216.3 connect to one or more of the storage devices 212.1-212.3 and process I/O requests. Accordingly, each of the plurality of nodes 208.1-208.3 in the clustered storage server arrangement provides the functionality of a storage server.

The M-Modules 218.1-218.3 provide management functions for the clustered storage system 202. The M-Modules 218.1-218.3 collect storage information regarding storage devices 212 and makes it available to performance manager 121. The M-Modules may also be used to configure QOS values (e.g. latency and throughput) for storage volumes that are managed by a node.

A switched virtualization layer including a plurality of virtual interfaces (VIFs) 219 is provided to interface between the respective N-modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of virtual servers (may also be referred to as "vservers" or virtual storage machines), in which each vserver represents a single storage system namespace with separate network access. Each vserver has a client domain and a security domain that are separate from the client and security domains of other vservers. Moreover, each vserver is associated with one or more VIFs 219 and can span one or more physical nodes, each of which can hold one or more VIFs and storage associated with one or more vservers. Client systems can access the data on a vserver from any node of the clustered system, through the VIFs associated with that vserver. It is noteworthy that the aspects described herein are not limited to the use of vservers.

Each of the nodes. 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Although FIG. 2A depicts an equal number (i.e., 3) of the N-modules 214.1-214.3, the D-modules 216.1-216.3, and the M-Modules 218.1-218.3, any other suitable number of N-modules, D-modules, and M-Modules may be provided. There may also be different numbers of N-modules, D-modules, and/or M-Modules within the clustered storage system 202. For example, in alternative aspects, the clustered storage system 202 may include a plurality of N-modules and a plurality of D-modules interconnected in a configuration that does not reflect a one-to-one correspondence between the N-modules and D-modules. In another aspect, the clustered storage system 202 may only include one N-module and D-module.

Each client system 204.1-204.N (or VM 105A-105N) may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Performance manager 121 interfaces with the various nodes and obtains QOS data for QOS data structure 123.

Details regarding QOS data and the process for using the QOS data are provided below.

Figure 2B:
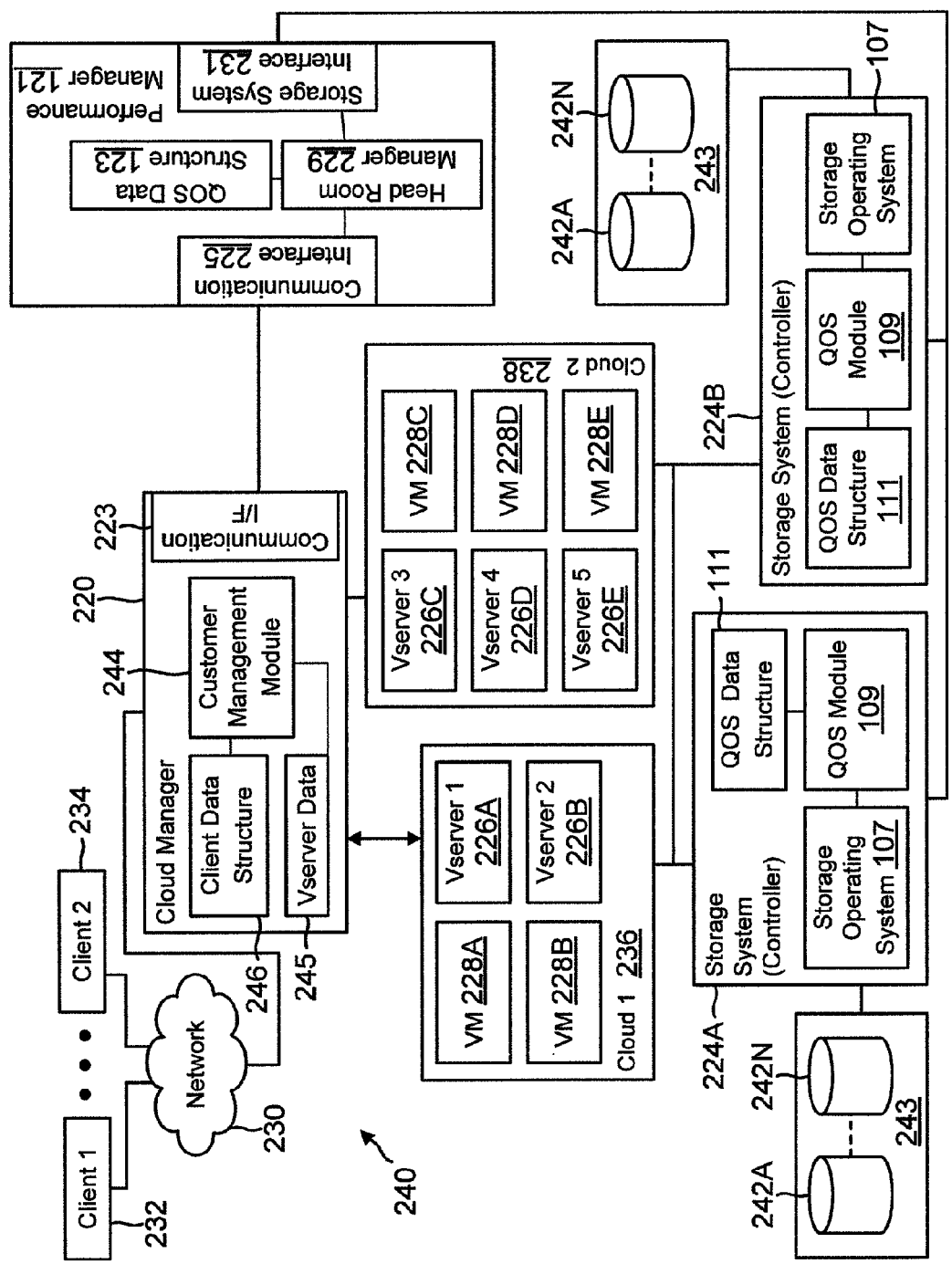
FIG. 2B shows an example of a system with a cloud manager and a performance manager for presenting a plurality of storage options, according to one aspect of the present disclosure.

Cloud Environment:

FIG. 2B shows one or more storage systems (224A/224B) in a cloud environment 240 analogous to storage system 108/202, according to one or more aspects. In one or more aspects, cloud environment 240 may be a computing environment configured to enable network access (e.g., on-demand) to a shared pool of configurable computing resources (e.g., networks, storage, host servers, applications, services). In one or more aspects, a storage system (or controller) may be a hardware resource configured to host one or more vservers in cloud environment 240.

Storage system 224A and storage system 224B may be deployed by a cloud manager 220 and/or a cloud administrator configured to provision the host systems, storage associated with one or more client devices (e.g., client 1 232, client 2 234) and/or services requested by the one or more client devices. As an example, storage system 224A may be configured to be associated with vserver 1 226A and vserver 3 226C, while storage system 224B may be configured to be associated with vserver 2 226B, vserver 4 226D and vserver 5 226E.

In one or more aspects, cloud manager 220 (or 119, FIG. 1) may enable one or more client devices to self-provision computing resources thereof. The cloud manager 220 may manage cloud portion(s) (e.g., cloud 1 236, cloud 2 238) associated with client 1 232 and client 2 234. Client 1 232 and/or client 2 234 may log into a console associated with cloud manager 220 to access cloud 1 236 and/or cloud 2 238 (and the VMs 228A-228E therein) through a public network 230 (e.g., Internet). The client devices and/or VMs associated therewith provided in cloud environment 240 may be analogous to the clients of FIG. 1/2A.

In order to address storage requirements/requests associated with client 1 232 and client 2 234, cloud manager 220 may be configured to appropriately provision vserver 1 226A, vserver 2 226B, vserver 3 226C, vserver 4 226D and vserver 5 226E and then allocate the appropriate vserver to client 1 232 and client 2 234. The aforementioned vservers may be virtualized entities utilized by client 1 232 and client 2 234 to meet storage requirements thereof. Multi-tenancy may allow for a storage system to have multiple vservers associated therewith. A portion of the cloud (e.g., cloud 1 236) including vserver 1 226A, vserver 2 226B and virtual machines (VMs; e.g., VM 228A, VM 228B) associated therewith may be associated with client 1 232 and a portion of the cloud (e.g., cloud 2 238) including vserver 3 226C, vserver 4 226D and vserver 5 226E and VMs (e.g., VM 228C, VM 228D, VM 228E) associated therewith may be associated with client 2 234.

The aforementioned cloud portions may be logical subsets of the cloud and may include VMs implemented with operating systems (e.g., Linux, Microsoft®'s Windows®). "Cloud" as used herein may refer to the large pool of configurable computing resources (e.g., virtualized computing resources) that may be subjected to a pay-per-use model, in which client(s) may enter into service agreement(s) with service provider(s). The portion of the "cloud," therefore, may refer to the pool of resources associated with a particular client. It is noteworthy that client 1 232 and/or client 2 234 may be entities (e.g., corporations, departments and others), and that there may be a number of computing devices associated with each of client 1 232 and/or client 2 234.

Cloud 1 236 and/or cloud 2 238 may span across several geographic regions. In one or more aspects, the aforementioned cloud portions may span multiple countries under differing jurisdictional guidelines. For example, a jurisdictional guideline may deem that a vserver needs to be launched on hardware (e.g., storage system) located in the same jurisdiction as the corresponding client(s).

In one or more aspects, administrators of cloud environment 240 may possess the authority to launch one or more vservers on any of storage system 224A and storage system 224B, irrespective of the location(s) thereof. An administrator may also modify the version of the storage operating system and/or configuration settings on storage system 224A and/or storage system 224B. In another example, an administrator may provision a vserver on a storage system offering lower performance and/or located in a geographic region different from that of a client device.

In one aspect, cloud environment 240 includes the performance manager 121. The performance manager 121 includes a storage system interface 231 that interfaces with the storage systems 224A/224B. The storage system interface 231 may use a Zephyr Application programming Interface (ZAPI), XML or any other interface type for communication with the storage systems. The aspects described herein are not limited to any particular interface.

QOS module 109 maintains the QOS data structure 111 at each storage system. The QOS data structure 111 identifies each storage volume (or LUN or virtual volume (vvol)) 242A-242N of a storage sub-system 243. The QOS data structure 111 stores the target latency and throughput rate that is associated with each volume. The target rates may be associated during storage volume/vserver configuration using a management application. The QOS information is provided to the performance manager 121 via the storage systems interface 231.

The performance manager 121 maintains QOS data structure 123 regarding the storage volumes 242A-242N of storage sub-system 243. QOS data structure 123 identifies each storage volume by a unique identifier, storage volume size, permissions associated with the storage volume, attributes associated with the storage volumes, a latency and/or throughput rate associated with each volume. It is noteworthy that the QOS data structure 123 may be split into one or more relational data structures.

Performance manager 121 may also include a headroom manager 229 that uses the QOS data structure 123 for finding a storage volume for a client. The client is presented with a plurality of options by a customer management module 244 of the cloud manager 220. When the client selects an option, then the client data structure 246 is updated to reflect the selection. The cloud manager 220 interfaces with the performance manager 121 using interface 223 and 225 to obtain a vserver and a storage volume that meets the latency and/or throughput requirement based on the selected option.

Headroom manager 229 evaluates the selected option, analyzes QOS data structure 123 to determine if an existing storage volume can be assigned. If an existing storage volume can be assigned, then the client is assigned the storage volume. The storage operating system 107 is notified such that QOS data structure 111 can be updated. The cloud manager 220 is also notified so that the vserver data 245 can be updated. The vserver data 245 includes a listing of vservers that are assigned to each client/VM. It is noteworthy that each cloud may have its own storage administrator that may store vserver data 245. The aspects described herein are not limited to which entity maintains and updates vserver data.

If an existing storage volume does not meet the throughput and/or latency requirement of the selected option, then a new storage volume may be assigned to the requirements of the selected option.

Figure 2C:
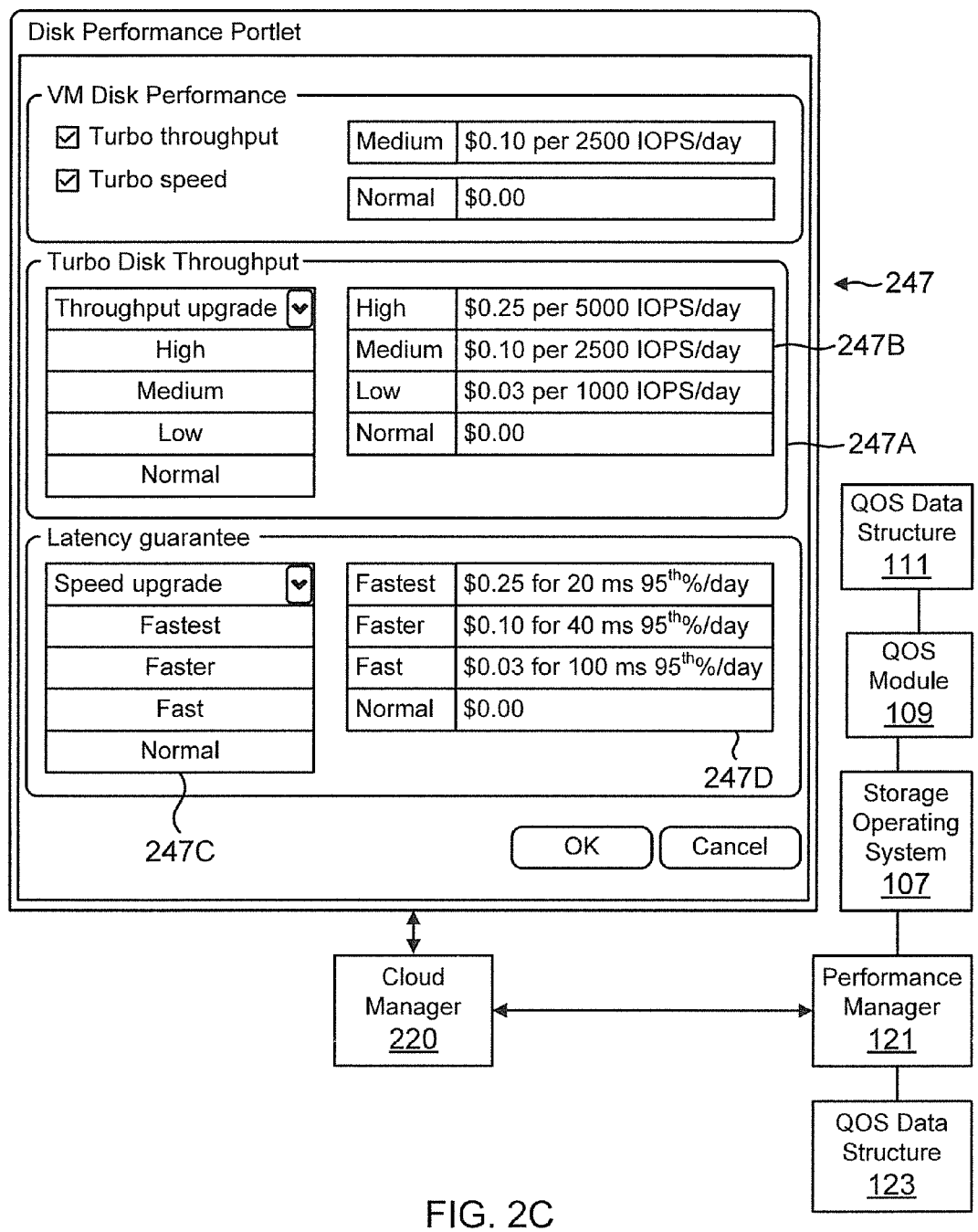
FIG. 2C shows an example of the plurality of options provided by the system of FIG. 2B, according to one aspect of the present disclosure.

FIG. 2C shows an interface 247 that is presented to clients, according to one aspect. Interface 247 may be web-based provided by the cloud manager 220. Interface 247 includes a throughput upgrade option 247A. The throughput upgrade option 247A is selectable and includes high, medium, low and normal options. Each option is associated with a throughput target rate and the client is charged according to the throughput target rate (shown as 247B). For example, for the "high" option, the client is charged a rate of 0.25 for processing 5000 TOPS per day, while a low option comes with a charge of $0.03 for processing 1000 TOPS per day.

Similar to the throughput option includes a latency upgrade option 247C. The latency target is lowest when the fastest speed is selected from 247C and highest when the normal speed is selected. Similar to throughput target rate, 247D shows an example of the different costs associated with the latency targets.

In one aspect, the performance options correspond to a policy group that was generated by a cluster administrator (not shown and can be a part of management application 117). The policy group may set an upper limit for latency and/or throughput rates based on a client's storage level. For example, for a "gold" level client, the maximum latency and/or throughput may be higher a "bronze" or lower level client. As an example, the gold level client has better features than the bronze level clients. The policy settings are available to the cloud manager as well as the storage operating systems.

Figure 2D:
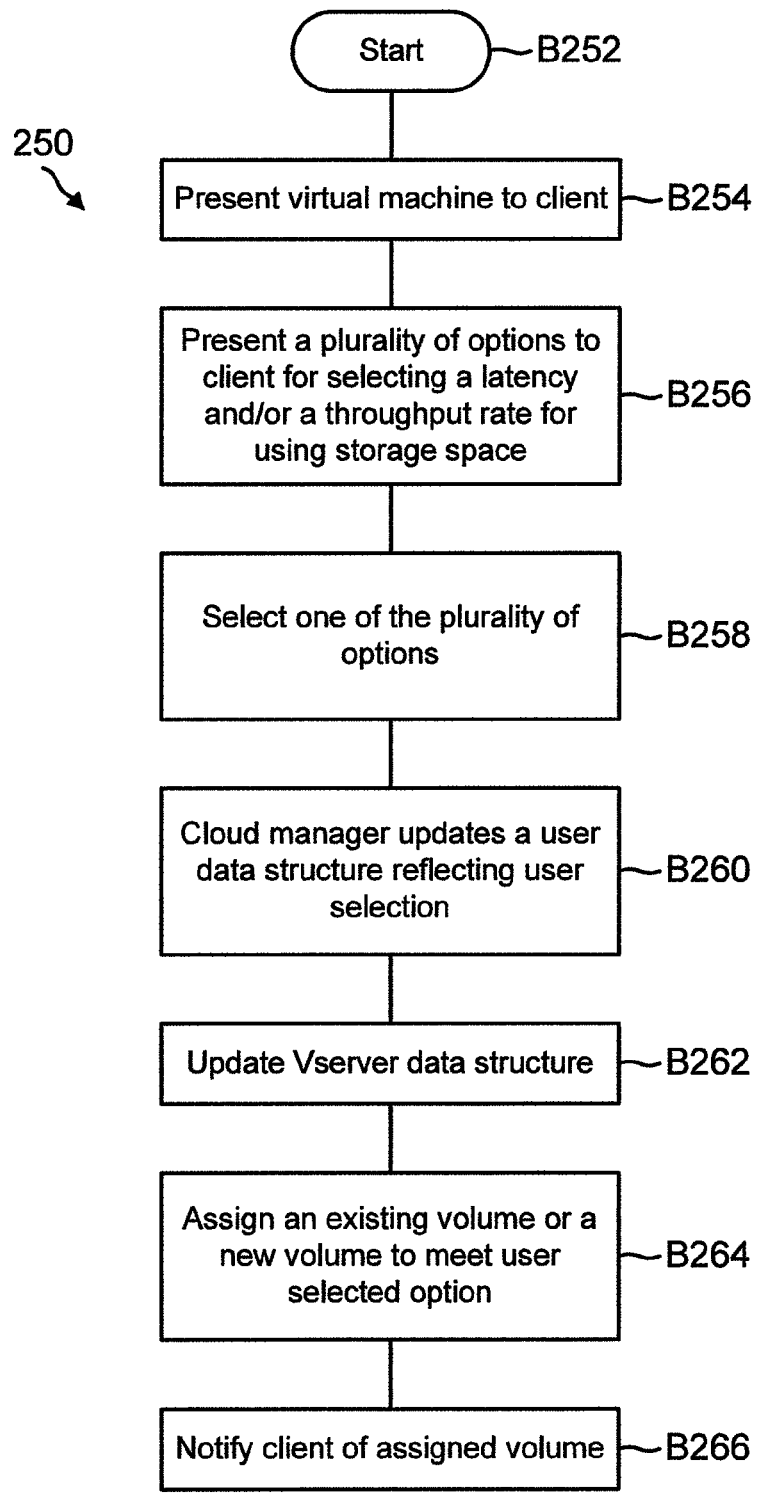
FIG. 2D shows a process flow for presenting storage in a cloud computing environment, according to one aspect of the present disclosure.

Process Flow:

FIG. 2D shows a process 250 for presenting storage space in cloud environment 240, according to one aspect. The process begins in block B252, when the various components of system 240 are operational. In block B254, a VM (for example, 228A) is presented to a client (for example, 232).

In block B256, the cloud manager 220 presents a plurality of options to a client. The options may be presented via a web interface provided at a computing device. Each option is associated with a guaranteed latency target and/or a throughput target rate. An example of the various options is shown in FIG. 2C and described above. The options that are presented to the client are based on certain policy level settings for the client, as mentioned above.

In block B258, the client selects one of the options via the web interface. In block B260, the cloud manager 220 updates the client data structure 246 reflecting the client selection. The updated data structure 246 can be used to charge the client based on the selected option. Customer management module 244 may be used to update client data structure 246.

In block 8262, the client selected options are also saved in the vserver data structure 245. The vserver 245 data structure identifies the vserver that will serve the client based on the selected option. The vserver may be an existing vserver or a new vserver that may be assigned to the client.

In block B264, an existing storage volume or a new storage volume is assigned for the client selected option. The customer management module 244 interfaces with the headroom manager 229 so that an appropriate storage volume can be assigned to the vserver for the client. In one aspect, headroom manager 229 assigns an existing storage volume or a new storage volume is created and then assigned to the vserver. The storage volume is selected based on the guaranteed latency target and/or throughput target rate. As described above, QOS data structure 123 that stores the latency and throughput information for each volume may be used to find the appropriate volume.

In block B266, the client is notified of the storage volume. In one aspect, a client can choose storage space based on proposed latency and/or throughput rates.

Existing systems do not provide this option in a cloud environment. Typically storage space in the cloud environment is presented based on storage size. In the current disclosure, by using the performance manager 121, the QOS data structures both at the performance manager 121 and storage systems 224A/224B, cloud manager 220 is able to offer storage based on QOS and performance based parameters. This allows the cloud manager to charge for storage based on performance rather than just storage space size.

Figure 3:
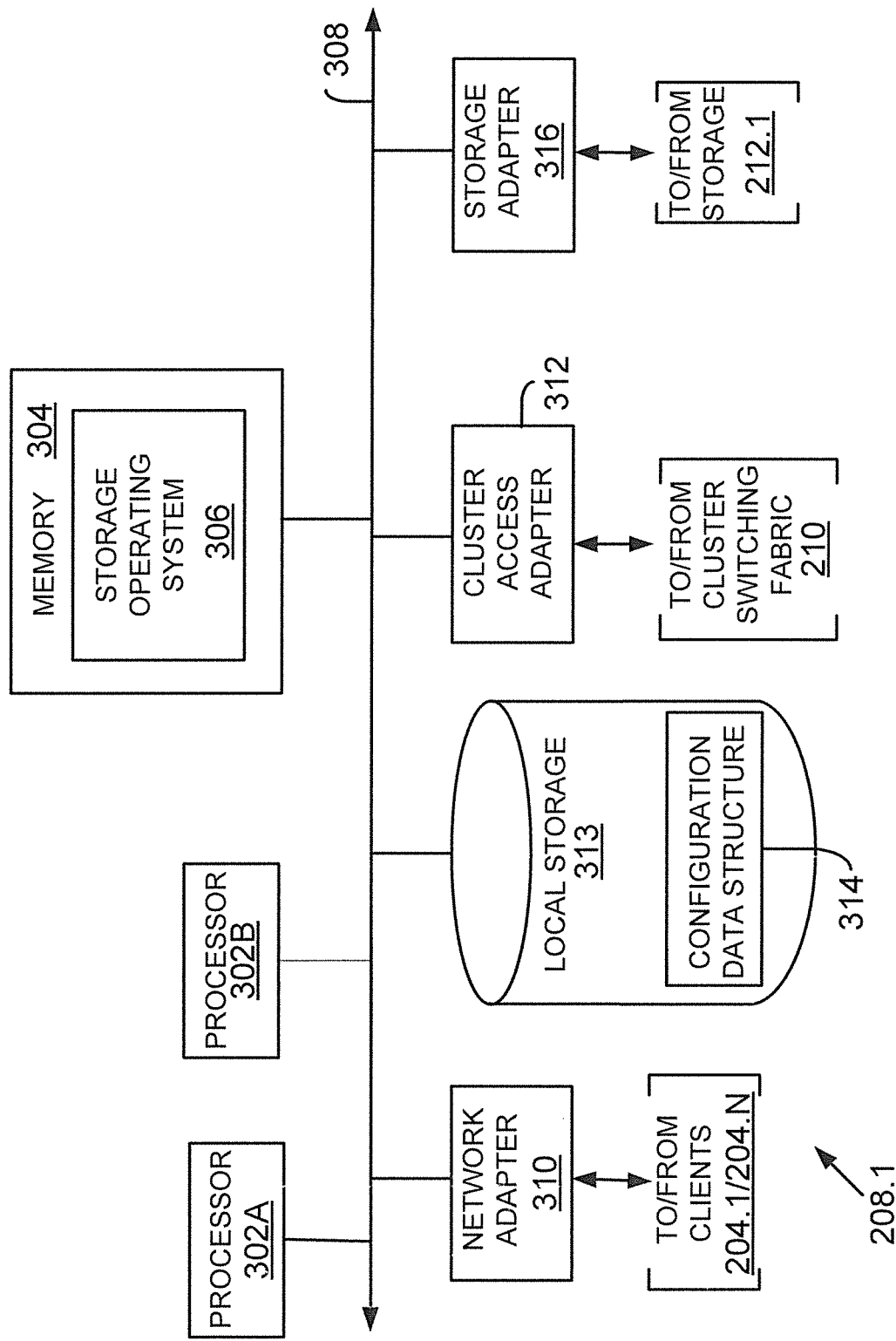
FIG. 3 shows an example of a storage system, according to one aspect of the present disclosure.

Storage System Node:

FIG. 3 is a block diagram of a node 208.1 that is illustratively embodied as a storage system comprising of a plurality of processors 302A and 302B, a memory 304, a network adapter 310, a cluster access adapter 312, a storage adapter 316 and local storage 313 interconnected by a system bus 308. Node 208.1 may be used to provide QOS information to performance manager 121 described above.

Processors 302A-302B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 313 comprises one or more storage devices utilized by the node to locally store configuration information for example, in a configuration data structure 314. The configuration information may include policy level information regarding storage volumes and their associated latency and throughput rates.

The cluster access adapter 312 comprises a plurality of ports adapted to couple node 208.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the N-modules and D-modules are implemented on separate storage systems or computers, the cluster access adapter 312 is utilized by the N/D-module for communicating with other N/D-modules in the cluster 100.

Each node 208.1 is illustratively embodied as a dual processor storage system executing a storage operating system 306 (similar to 107, FIG. 1) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 302A executes the functions of the N-module 104 on the node, while the other processor 302B executes the functions of the D-module 106.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 306 portions of which is typically resident in memory and executed by the processing elements, functionally organizes the node 208.1 by, inter alia, invoking storage operation in support of the storage service implemented by the node.

The network adapter 310 comprises a plurality of ports adapted to couple the node 208.1 to one or more clients 204.1/204.N over point-to-point links, wide area networks, virtual private networks implemented over a public network (Internet) or a shared local area network. The network adapter 310 thus may comprise the mechanical, electrical and signaling circuitry needed to connect the node to the network. Illustratively, the computer network 206 may be embodied as an Ethernet network or a Fibre Channel network. Each client 204.1/204.N may communicate with the node over network 206 by exchanging discrete frames or packets of data according to pre-defined protocols, such as TCP/IP.

The storage adapter 316 cooperates with the storage operating system 306 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 316 comprises a plurality of ports having input/output (I/O) interface circuitry that couples to the storage devices over an I/O interconnect arrangement, such as a conventional high-performance, FC link topology.

Figure 4:
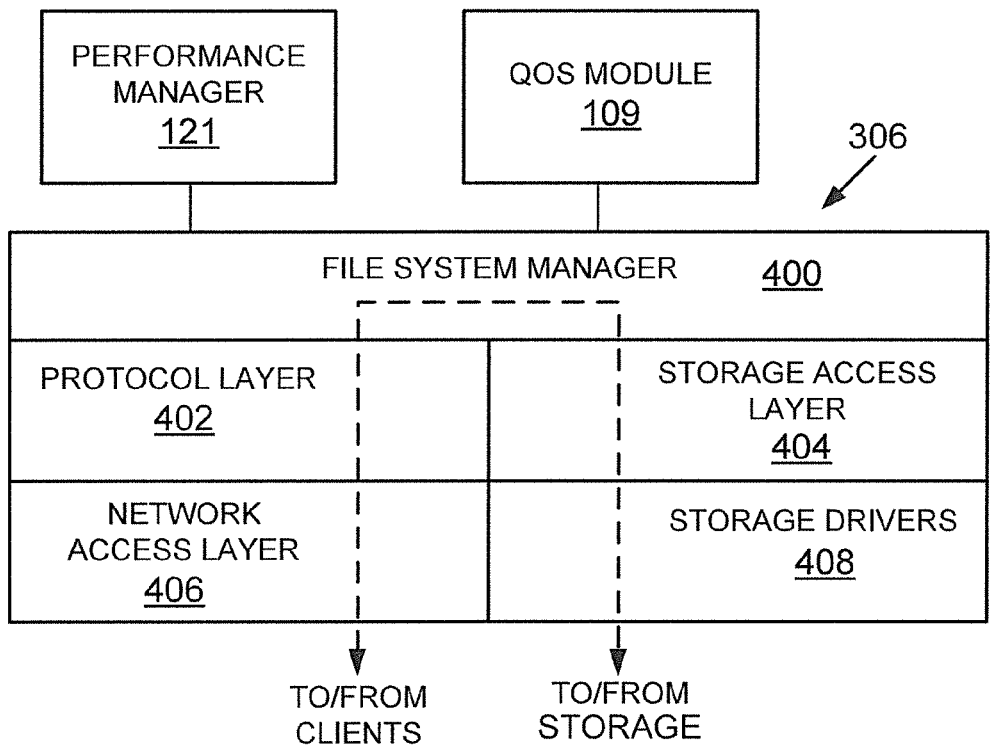
FIG. 4 shows an example of a storage operating system, used according to one aspect of the present disclosure.

Operating System:

FIG. 4 illustrates a generic example of storage operating system 306 (or 107, FIG. 1) executed by node 208.1, according to one aspect of the present disclosure. The storage operating system 306 interfaces with the QOS module 109 and the performance manager 121 such that proper bandwidth and QOS policies are implemented at the storage volume level.

In one example, storage operating system 306 may include several modules, or "layers" executed by one or both of N-Module 214 and D-Module 216. These layers include a file system manager 400 that keeps track of a directory structure (hierarchy) of the data stored in storage devices and manages read/write operation, i.e. executes read/write operation on storage in response to client 204.1/204.N requests.

Storage operating system 306 may also include a protocol layer 402 and an associated network access layer 406, to allow node 208.1 to communicate over a network with other systems, such as clients 204.1/204.N. Protocol layer 402 may implement one or more of various higher-level network protocols, such as NFS, CIFS, Hypertext Transfer Protocol (HTTP), TCP/IP and others.

Network access layer 406 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 306.

The storage operating system 306 may also include a storage access layer 404 and an associated storage driver layer 408 to allow D-module 216 to communicate with a storage device. The storage access layer 404 may implement a higher-level storage protocol, such as RAID (redundant array of inexpensive disks), while the storage driver layer 408 may implement a lower-level storage device access protocol, such as FC or SCSI. The storage driver layer 408 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 5:
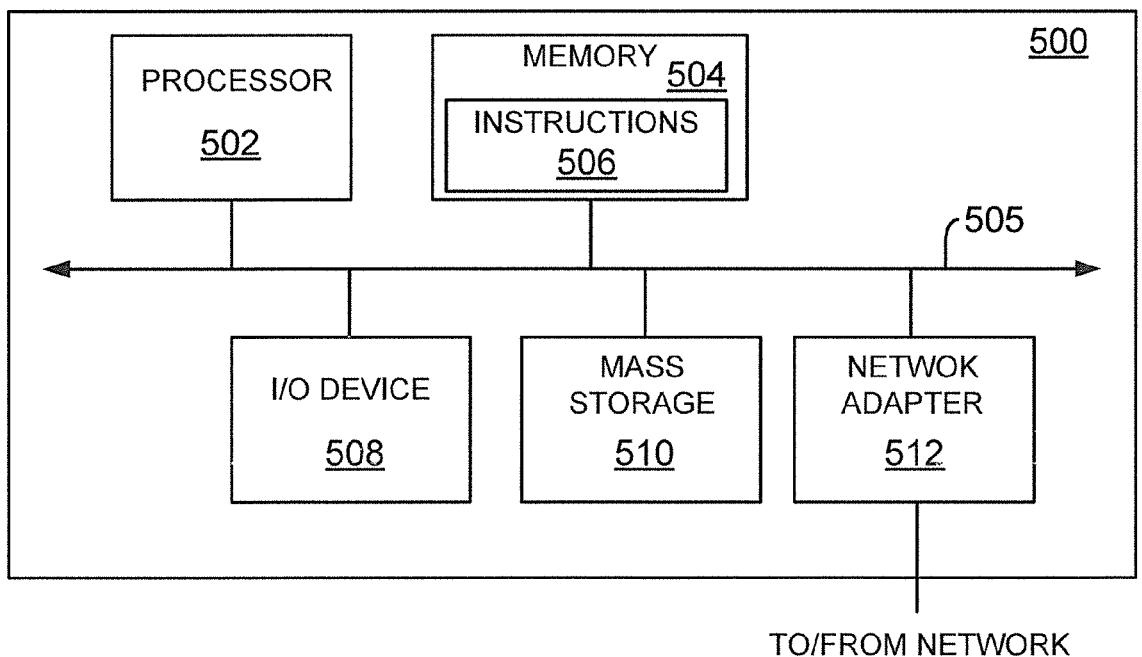
FIG. 5 shows an example of a processing system, used according to one aspect of the present disclosure.

Processing System:

FIG. 5 is a high-level block diagram showing an example of the architecture of a processing system 500 that may be used according to one aspect. The processing system 500 can represent host system 102, management console 118, clients 116, 204, 232 and/or 234, cloud manager 220, or storage system 108/224A/224B. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 implement the process steps of FIG. 2D described above may reside in and execute (by processors 502) from memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system 500 with the ability to communicate with remote devices (e.g., storage servers) over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

The aspects described above have various advantages. The aspects allow a cloud manager or any other entity to monetize latency and throughput when associated with storage space. Conventional systems do not provide a mechanism by which one is able to monetize these features when offering storage space to clients in a cloud environment.

Thus, a method and apparatus for presenting storage in a cloud environment have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
   interfacing a cloud manager module of a cloud environment with a storage system having a plurality of storage devices, where the cloud manager module presents storage device options to a plurality of clients and the storage system stores and retrieves data on behalf of clients; monitors performance of the plurality of storage devices including throughput and latency and maintains configuration information for a plurality of storage volumes used for storing client data;
   maintaining latency target and throughput target for the plurality of storage volumes by the storage system;
   presenting by a processor a first plurality of options and a second plurality of options to a client for using storage space at the plurality of storage devices managed by the storage system in the cloud computing environment, where each option of the first plurality of options is associated with a latency target and each option of the second plurality of options is associated with a throughput target and the client selects any of the first plurality of options and any of the second plurality of options;
   wherein the client is charged according to a latency target rate associated with each option of the first plurality of options and a throughput target rate associated with each option of the second plurality of options such that a first price is charged for a higher throughput target and lower latency target and a second price for lower throughput target and higher latency target and the first price is greater than the second price; and
   wherein the latency target provides a delay in processing input/output (I/O) requests and the throughput target provides a number of I/O requests that are processed within a unit of time;
   assigning by the processor an existing volume to the client when the existing volume meets a guaranteed latency target and a guaranteed throughput target for options selected from among the first plurality of options and the second plurality of options;
   allocating by the processor a new volume for the client to meet the guaranteed latency target and the guaranteed throughput target when any existing volume does not meet the guaranteed latency target and the guaranteed throughput target; and
   identifying by the processor a virtual server for servicing client requests based on options selected from the first plurality of options and the second plurality of options.

2. The method of claim 1, wherein the first plurality of options include a first option with a lower latency target and a second option with a higher latency target for processing I/O requests.

3. The method of claim 2, wherein the first option provides a higher throughput target than a throughput target associated with the second option.

4. The method of claim 1, wherein the cloud manager module presents the first plurality of options and the second plurality of options to the client.

5. The method of claim 1, wherein a performance manager module maintains a data structure with information regarding storage volumes and associated throughput and latency targets assigned to the storage volumes for determining whether any existing volume meets the guaranteed latency target and the guaranteed throughput target.

6. A non-transitory, machine readable storage medium storing executable instructions, which when executed by a machine, causes the machine to perform a method, the method comprising:
   interfacing a cloud manager module of a cloud environment with a storage system having a plurality of storage devices, where the cloud manager module presents storage device options to a plurality of clients and the storage system stores and retrieves data on behalf of clients; monitors performance of the plurality of storage devices including throughput and latency and maintains configuration information for a plurality of storage volumes used for storing client data;
   maintaining latency target and throughput target for the plurality of storage volumes by the storage system;
   presenting by a processor a first plurality of options and a second plurality of options to a client for using storage space at the plurality of storage devices managed by the storage system in the cloud computing environment, where each option of the first plurality of options is associated with a latency target and each option of the second plurality of options is associated with a throughput target and the client selects any of the first plurality of options and any of the second plurality of options;

wherein the client is charged according to a latency target rate associated with each option of the first plurality of options and a throughput target rate associated with each option of the second plurality of options such that a first price is charged for a higher throughput target and lower latency target and a second price for lower throughput target and higher latency target and the first price is greater than the second price; and wherein the latency target provides a delay in processing input/output (I/O) requests and the throughput target provides a number of I/O requests that are processed within a unit of time;

assigning by the processor an existing volume to the client when the existing volume meets a guaranteed latency target and a guaranteed throughput target for options selected from among the first plurality of options and the second plurality of options;

allocating by the processor a new volume for the client to meet the guaranteed latency target and the guaranteed throughput target when any existing volume does not meet the guaranteed latency target and the guaranteed throughput target; and identifying by the processor a virtual server for servicing client requests based on options selected from the first plurality of options and the second plurality of options.

7. The storage medium of claim 6, wherein the first plurality of options include a first option with a lower latency target and a second option with a higher latency target for processing I/O requests.

8. The storage medium of claim 7, wherein the first option provides a higher throughput target than a throughput target associated with the second option.

9. The storage medium of claim 6, wherein the cloud manager module presents the first plurality of options and second plurality of options to the client.

10. The storage medium of claim 6, wherein a performance manager module maintains a data structure with information regarding storage volumes and associated throughput and latency targets assigned to the storage volumes for determining whether any existing volume meets the guaranteed latency target and the guaranteed throughput target.

11. A cloud based system, comprising:
a processor for a cloud manager executing instructions out of a memory for interfacing with a storage system in a cloud environment and presenting a first plurality of options and a second plurality of options to a client for using storage space in the cloud computing environment, where the storage system stores and retrieves data on behalf of clients; monitors performance of a plurality of storage devices including throughput and latency information and maintains configuration information for a plurality of storage volumes used for storing client data at a plurality of storage devices, wherein each option of the first plurality of options is associated with a latency target and each option of the second plurality of options is associated with a throughput target and the client selects any of the first plurality of options and any of the second plurality of options;

wherein the latency target provides a delay in processing input/output (I/O) requests and the throughput target provides a number of I/O requests that are processed within a unit of time; and wherein the client is charged according to a latency target rate associated with each option of the first plurality of options and a throughput target rate associated with each option of the second plurality of options such that a first price is for a higher throughput target and a lower latency target greater than a second price for a lower throughput target and a higher latency target; and a processor for a performance manager module executing instructions out of a memory for determining when an existing volume from among the plurality of storage volumes can be assigned to the client for using the storage space with a guaranteed latency target, a guaranteed throughput target or both the guaranteed latency target and the guaranteed throughput target, based on selected options;

wherein the existing volume is assigned to a virtual machine when the existing volume meets the guaranteed latency target and the guaranteed throughput target for the selected options;

wherein a new volume is allocated to meet the guaranteed latency target and the guaranteed throughput target when any existing volume does not meet the guaranteed latency target and the guaranteed throughput target; and wherein a virtual server is identified for servicing client requests based on options selected from among the first plurality of options and the second plurality of options.

12. The system of claim 11, wherein the first plurality of options include a first option with a lower latency target and a second option with a higher latency target for processing I/O requests.

13. The system of claim 12, wherein the first option provides a higher throughput target than a throughput target associated with the second option.

14. The system of claim 11, wherein the performance manager module maintains a data structure with information regarding storage volumes and associated throughput and latency targets assigned to the storage volumes for determining whether any existing volume meets the guaranteed latency target and the guaranteed throughput target.

* * * * *